(12) United States Patent
Welch

(10) Patent No.: US 6,177,905 B1
(45) Date of Patent: Jan. 23, 2001

(54) LOCATION-TRIGGERED REMINDER FOR MOBILE USER DEVICES

(75) Inventor: Bryan J. Welch, Northglenn, CO (US)

(73) Assignee: Avaya Technology Corp., Miami Lakes, FL (US)

(*) Notice: Under 35 U.S.C. 154(b), the term of this patent shall be extended for 0 days.

(21) Appl. No.: 09/207,882

(22) Filed: Dec. 8, 1998

(51) Int. Cl.$^7$ .................. G01S 5/02; H04B 7/185
(52) U.S. Cl. .............. 342/357.13; 701/208; 701/211
(58) Field of Search ............. 342/357.13; 701/211, 701/208

(56) References Cited

U.S. PATENT DOCUMENTS

| 5,470,233 | * 11/1995 | Fruchterman et al. |
|---|---|---|
| 5,497,149 | * 3/1996 | Fast ........................ 340/988 |
| 5,790,974 | 8/1998 | Tognazzini ................. 701/204 |
| 5,848,373 | 12/1998 | DeLorme et al. ............ 701/200 |
| 6,064,941 | * 5/2000 | Nimura et al. .............. 701/210 |

FOREIGN PATENT DOCUMENTS

| WO 98 35311 | 8/1998 | (EP) | .............. G08G/1/123 |
|---|---|---|---|
| 0 908 835 | 4/1999 | (EP) | .............. G06F/17/60 |

OTHER PUBLICATIONS

Zeli Systems Homepage, Providing "No Hassle" GPS Solutions for Popular Computer Platforms.
U. S. Robotics, Copyright 1997, *Palm Pilot*, The Connected Organizer Handbook,—pp. ii–iii, pp. 1–22, pp. 45–63, pp. 77–85, pp. 135–150.

* cited by examiner

*Primary Examiner*—Theodore M. Blum
(74) *Attorney, Agent, or Firm*—David Volejnicek

(57) ABSTRACT

A mobile user device, such as a personal digital assistant (PDA 100), a wireless telephone, a car phone, or any other programmable device that the user generally has with him or her, is equipped with a global positioning system (GPS) receiver (101) and is programmable (102) by the user to alert the user to when he or she arrives with the device at a predetermined location (252), as well as to disclose (101) to the user whatever information (263) the user chose to associate with that location (e.g., a "to-do" list). The user can program in the geographical coordinates (253) of locations and location names (252), and thereafter refer to the locations by name. The user can also program in a range (254) around each location, so that his or her arrival within that range will trigger the alert for the location.

9 Claims, 2 Drawing Sheets

LOCATION-TRIGGERED REMINDER FOR MOBILE USER DEVICES

TECHNICAL FIELD

This invention relates to features of mobile user devices, such as personal digital assistants and wireless communications devices.

BACKGROUND OF THE INVENTION

Many things that a person has to do are associated with particular places. For example, one mails a letter at a post office or a mailbox, buys groceries at a local grocery store, and checks the condition of furnace filters at home. There is presently no easy way for a person to be reminded of something (e.g., a to-do item) when he or she arrives at a corresponding location. Hence, a person is usually required to keep the association of the action and the corresponding location at the forefront of their mind, and thus subject to be forgotten.

SUMMARY OF THE INVENTION

This invention is directed to solving these and other problems and disadvantages of the prior art. Illustratively, according to the invention, a mobile user device—such as a personal digital assistant (PDA), a wireless telephone, a car phone, or any other programmable device that the user generally has with him or her—is equipped with a global positioning system (GPS) receiver and is programmable by the user to alert the user to when he or she (along with the device) arrives at a predetermined location, as well as to disclose to the user whatever information or perform whatever action the user chose to associate with the location. Thus, for example, when the user arrives in the vicinity of the post office, the device alerts him or her that they have a letter to post; when the user is passing by the local grocery store, the device alerts him or her and displays a shopping list; and when the user arrives at home, the device alerts him or her to check the furnace filters. Consequently, the user does not have to rely on his or her memory to be reminded of desired information or actions upon his or her arrival at a particular location.

Generally according to the invention, an apparatus comprises a mobile (e.g., a portable) device that includes an information input facility and an information output facility, a global positioning system receiver connected to the mobile device for indicating to the portable device a geographical location of the mobile device, a matcher responsive to information received via the input facility specifying a geographical location and information associated therewith for repeatedly determining whether a presently-indicated said geographical location matches the specified geographical location, and a notifier responsive to the matcher's determination of a match for generating an alert and disclosing the associated information via the output facility (e.g., a display, an I/O port). Preferably, the portable device is for accompanying (e.g., being carried by) a user, the information input facility enables the user to input information, including the information associated with the geographical location and information specifying the geographical location into the device, the information output facility enables the user to receive information, including the information associated with the geographical location from the device, and the notifier generates an alert for alerting the user accompanying the device.

These and other features and advantages of the invention will become more apparent from the following description of an illustrative embodiment of the invention considered together with the drawing.

DETAILED DESCRIPTION

Figure 1:
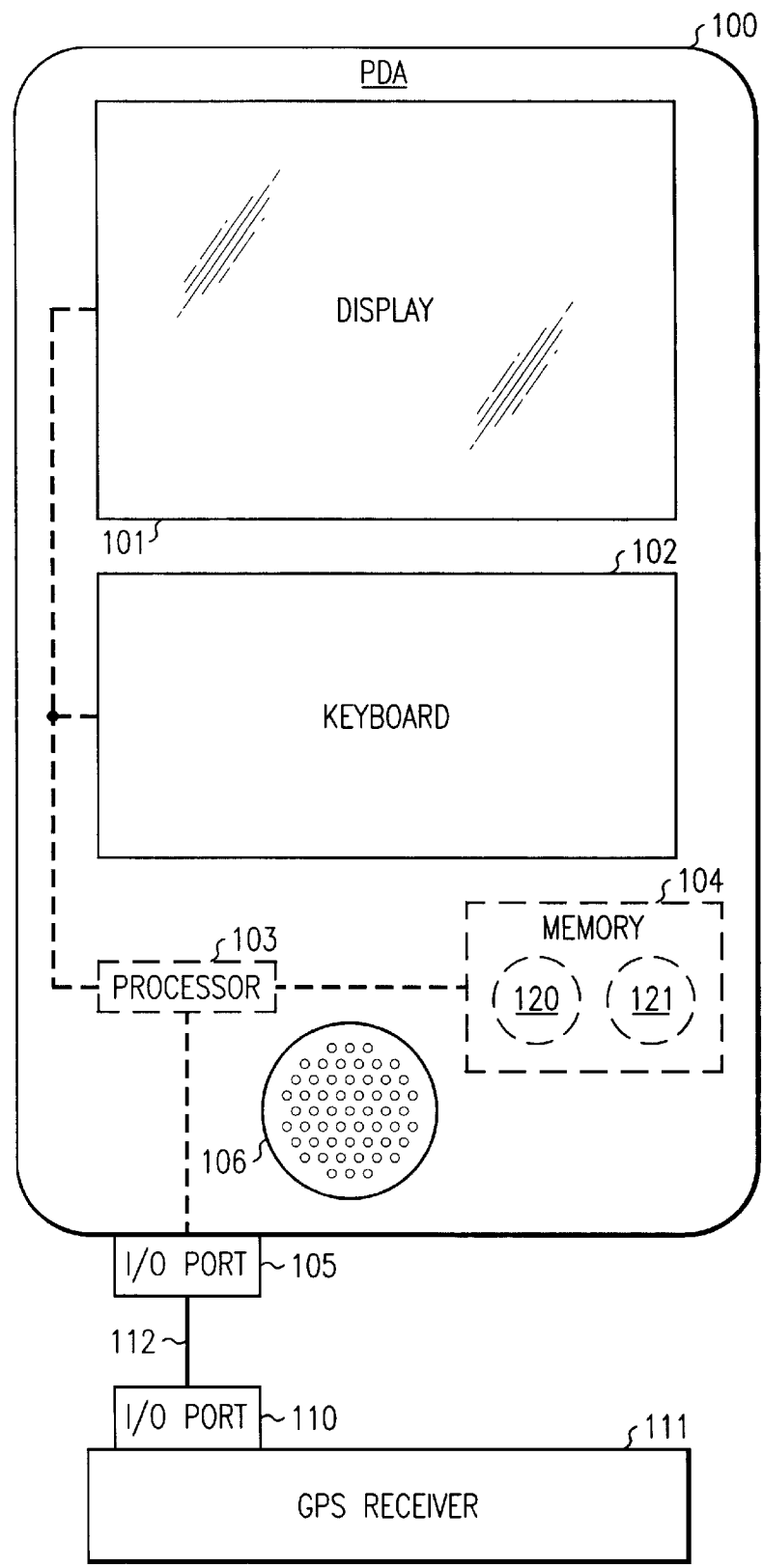
FIG. 1 is a block diagram of a mobile user device that includes an illustrative embodiment of the invention.

FIG. 1 shows an illustrative mobile user device constructed according to the invention. The mobile user device is a portable device that comprises a combination of a personal digital assistant (PDA) 100 and a global positioning system (GPS) receiver 111. PDA 100 conventionally includes a keyboard 102 for use by the user to enter information into PDA 100, a display 101 for displaying information to the user, an alerter 106 for alerting the user, a processor 103 for controlling the operation of PDA 100 by executing stored programs, a memory 104 for storing the programs and data for use by processor 103, and an input and output (I/O) port 105 for connecting PDA 100 to external devices. Instead of or in addition to keyboard 102 and display 101, PDA 100 may include an audio recording facility for use by the user to enter the information, and an audio playback facility for playing back information to the user. Illustratively, PDA 100 is the Palm Pilot™ of 3Com company, and I/O port 105 is its Hot Sync port. GPS receiver 111 likewise conventionally includes an I/O port 110 for connecting GPS receiver 111 to external devices.

According to the invention, PDA 100 and GPS receiver 111 are connected 112 to each other via their I/O ports 105 and 110, and memory 104 of PDA 100 includes a location-triggered reminder program 121. The connection between PDA 100 and GPS receiver 111 enables GPS receiver 111 to inform PDA 100 of their location. For example, GPS receiver 111 may report their location either periodically or whenever it is polled by PDA 100. Alternatively, PDA 100 may request GPS receiver 111 to inform it whenever they arrive at one or more locations specified by PDA 100. Program 121 allows a user of the device to program into PDA 100 names of geographical locations and their corresponding geographical coordinates, to specify that he or she wishes to be alerted upon arrival at one or more of those geographical locations, and to associate information with those locations that he or she wishes to be reminded of.

Figure 2:
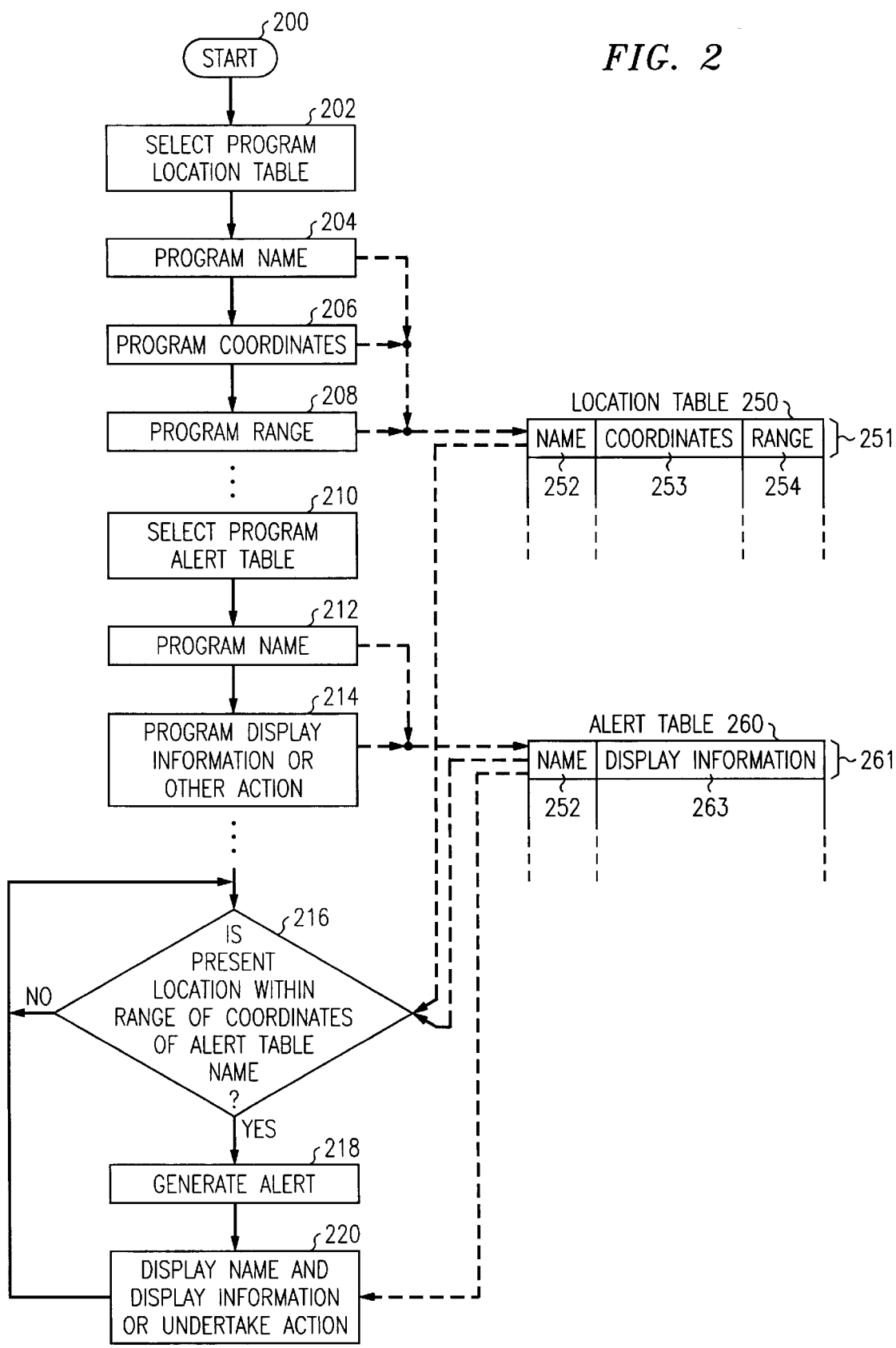
FIG. 2 is a functional flow diagram of operations performed by a location-triggered reminder program of the mobile user device of FIG. 1.

The operation of program 121 is shown in FIG. 2. Upon being invoked, at step 200, program 121 gives the user a choice of programming a location table 250 or an alert table 260. If the user selects to program location table 250, at step 202, program 121 allows the user to create, delete, or change an entry 251 in location table 250. Each entry 251 comprises a name 252 of a geographical location, geographical coordinates 253 of the location, and a range 254 around coordinates 253, e.g., within 0.1 second of latitude and longitude of coordinates 253, or within 100 meters of coordinates 253. The user selects and programs name 252—e.g., "post office", "store", or "home"—via keyboard 102, at step 204, programs the coordinates 253, at step 206, illustratively by taking the device to the named location and there pressing a key of keyboard 102 that causes PDA 100 to store the coordinates presently being generated by GPS receiver 111, and programs range 254 via keyboard 102, at step 208.

If and when the user selects to program alert table 260, at step 210, program 121 allows the user to create, delete, or change an entry 261 in alert table 260. Each entry 261 comprises a name 252 of a geographical location from an entry 251 of location table 250 and display information 263. Display information 263 is information that the user wants to be reminded of upon arrival at the named location. Besides information for displaying on display 101 of PDA 100, it may include other information such as an indication (e.g., a program) of action that the user wants PDA 100 to undertake upon arrival at the named location. The user may program either the display information itself or a pointer to where the information may be found. For example, PDA 100 may include a grocery list program 120, and the user may point display information field 263 to display the grocery list of program 120. The user selects and programs name 252 via keyboard 102, at step 212, and programs display and/or action information 263 via keyboard 102, at step 214.

When alert table 260 is not empty, program 121 cooperates with GPS receiver 111 to determine if their present geographical location is within range 254 of coordinates 253 of any location whose name 252 appears in alert table 260, at step 216. When they arrive within the range of one of those named locations, PDA 100 generates an alert via alerter 106, at step 218—for example, by emitting an alarm sound, or by vibrating—and displays on display 101 whatever information is specified by display information 263 of that named location's entry 201. Program 121 then returns to step 216.

Of course, various changes and modifications to the illustrative embodiment described above will be apparent to those skilled in the art. For example, the alert can take many different forms, including sounding a buzzer, flashing a light on the dashboard of an automobile, on a cell phone, or on a screen of a laptop computer, or making a phone call to a predetermined number. Also, instead of or in addition to displaying information associated with a location, other actions may be taken, including sending signals on the I/O port to other devices such as personal computers or an automobile. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:
   a mobile device for accompanying a user of the mobile device and including an information input facility and an information output facility;
   a position receiver for indicating a geographical location of the mobile device;
   a matcher cooperative with the information input facility and the receiver, responsive to information received from the user via the input facility specifying a geographical location and a geographical range around the geographical location in association with a name corresponding to the geographical location, and separately specifying the name in association with user information that the user wants to associate with the geographical location, for repeatedly determining whether a presently indicated said geographical location of the mobile device matches within a specified said geographical range a specified said geographic location that is associated with a specified said name that has specified said user information associated therewith; and
   a notifier cooperative with the matcher and the information output facility, responsive only to a determination of said match, for generating an alert for alerting the user and disclosing said specified user information to the user via the output facility.

2. The apparatus of claim 1 wherein:
   the mobile device is one of a personal digital assistant, a portable computer, and a wireless communications terminal.

3. The apparatus of claim 1 further comprising:
   a first information store cooperative with the information input facility, responsive to receipt of the name for storing the received name in association with one of (a) a presently-indicated said geographical location of the mobile device, and (b) a geographical location specified by the information received via the information input facility; and
   a second information store cooperative with the information input facility, responsive to receipt of the name and the user information associated therewith, for storing the received name in association with the user information associated therewith; and
   the matcher is cooperative with the first and the second information stores, for repeatedly determining whether the presently-indicated geographical location of the mobile device matches within the specified range any said location stored by the first information store in association with any said name that is also stored by the second information store in association with any said user information.

4. The apparatus of claim 3 wherein:
   the information received and stored by the first information store in association with the name further specifies the geographical range corresponding to the name;
   the matcher is responsive to the range, for repeatedly determining whether the presently-indicated geographical location of the mobile device lies within the stored range of the location stored by the first information store in association with any said name that is also stored by the second information store in association with any said user information.

5. A method comprising:
   receiving, in a mobile device for accompanying a user of the mobile device, information indicating a present geographical location of the mobile device;
   receiving from the user, in the mobile device, information specifying a geographical location and a geographical range around the geographical location in association with a name corresponding to the geographical location;
   receiving from the user, in the mobile device, information specifying the name in association with user information that the user wants to associate with the geographical location;
   in response, repeatedly determining whether a presently-indicated said present geographical location of the mobile device matches within a specified said geographical range a specified said geographical location that is associated with a specified said name that has specified said user information associated therewith;
   in response to a determination of a match, generating an alert for alerting the user; and
   further in response to the determination of the match, disclosing said specified user information to the user.

6. The method of claim 5 wherein:
   receiving information specifying a geographical location and information associated therewith comprises firstly receiving the name from the user, in response storing the firstly-received name in association with one of (a) a presently-indicated said present geographical location of the mobile device, and (b) a geographical location specified by the information received from the user, secondly receiving the name and the user information associated therewith from the user, in response, separately storing the secondly-received name in association with the user information associated therewith; and repeatedly determining comprises repeatedly determining whether the presently-indicated present geographical location of the mobile device matches within the specified-range any said location stored in association with any said name that is also separately stored in association with any said user information.

7. The method of claim 6 wherein:

secondly receiving further includes receiving information specifying the geographical range corresponding to the stored location, and in response storing the received range in association with the firstly-received name; and repeatedly determining whether the presently-indicated present geographical location of the mobile device matches within the specified-range any said location stored in association with any said name that is separately stored in association with any said information comprises repeatedly determining whether the presently-indicated present geographical location of the mobile device lies within the stored range of the location stored in association with said any said name that is also separately stored in association with any said user information.

8. An apparatus that performs the method of claim 5 or 6 or 7.

9. A computer-readable medium containing software which, when executed in a computer, causes the computer to perform the method of claim 5 or 6 or 7.

* * * * *